US011443361B1

(12) United States Patent
Lim et al.

(10) Patent No.: US 11,443,361 B1
(45) Date of Patent: Sep. 13, 2022

(54) ITEM ORDERING FROM AN EMBEDDED ORDERING DEVICE

(71) Applicant: Amazon Technologies, Inc., Seattle, WA (US)

(72) Inventors: Jonathan Patrick Lim, Seattle, WA (US); Stephen Pate Smith, Kirkland, WA (US); Benjamin Thomas Logsdon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/659,414

(22) Filed: Oct. 21, 2019

Related U.S. Application Data (62) Division of application No. 14/802,773, filed on Jul. 17, 2015, now Pat. No. 10,453,115.

(51) Int. Cl.
| | |
|---|---|
| *G06Q 30/00* | (2012.01) |
| *G06Q 30/06* | (2012.01) |
| *G06Q 10/08* | (2012.01) |
| *G06Q 30/02* | (2012.01) |
| *H04W 76/10* | (2018.01) |

(52) U.S. Cl.
CPC ....... *G06Q 30/0635* (2013.01); *G06Q 10/083* (2013.01); *G06Q 30/0241* (2013.01); *G06Q 30/0267* (2013.01); *G06Q 30/0601* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 5,305,199 A | 4/1994 | Lobiondo et al. | |
| 5,655,174 A | 8/1997 | Hirst | |
| 6,023,593 A | 2/2000 | Tomidokoro | |
| 6,204,763 B1 | 3/2001 | Sone | |
| 6,529,692 B1 | 3/2003 | Haines et al. | |
| 8,150,771 B1 | 4/2012 | Baram | |
| 8,631,126 B2 | 1/2014 | Veiseh et al. | |
| 8,924,262 B2 | 12/2014 | Shuster | |
| 9,286,613 B2 * | 3/2016 | Pilu | G06Q 30/02 |

(Continued)

OTHER PUBLICATIONS

Ferrer-Vidal, Antonio, Integration of Sensors and RFID's on Ultra-Low-Cost-Paper-Based-Substrates for Wireless Sensor Network Applications, Jan. 22, 2007, 2006 2nd IEEE Workshop on Wireless Mesh Networks, pp. 126-128 (Year: 2007).*

(Continued)

*Primary Examiner* — Jeffrey A. Smith
*Assistant Examiner* — Timothy J Kang
(74) *Attorney, Agent, or Firm* — Athorus, PLLC (57) ABSTRACT

Described are systems, methods and arrangements for enabling fulfillment of items from printed materials. When printed material is generated it includes an embedded ordering device ("EOD") that can be activated by a user that is viewing the printed material. Upon activation, the EOD connects to a wireless network and sends a unique identifier data to a fulfillment service. The fulfillment service, upon receiving the unique identifier data determines an item associated with the unique identifier data and a delivery destination (e.g., the address to which the printed material was delivered) and fulfills the item to the delivery destination.

22 Claims, 9 Drawing Sheets

(56) References Cited

U.S. PATENT DOCUMENTS

| | | | |
|---|---|---|---|
| 2001/0049846 A1 | 12/2001 | Guzzi et al. | |
| 2002/0163662 A1 | 11/2002 | Kaufman et al. | |
| 2006/0277817 A1 | 12/2006 | Rousso et al. | |
| 2008/0109309 A1* | 5/2008 | Landau | G09F 27/00 705/14.64 |
| 2011/0310433 A1* | 12/2011 | Hagiwara | H04N 1/00233 358/1.15 |
| 2012/0268615 A1 | 10/2012 | Choi et al. | |
| 2012/0325906 A1* | 12/2012 | Rathus | G06Q 30/0251 977/774 |
| 2013/0151436 A1* | 6/2013 | Klingenberg | G06Q 10/0833 705/341 |
| 2013/0211893 A1* | 8/2013 | Bryant | G06Q 30/0267 705/14.16 |
| 2015/0144650 A1 | 5/2015 | Kline et al. | |
| 2015/0149280 A1* | 5/2015 | Patterson | G06Q 30/0267 705/14.53 |
| 2015/0242941 A1 | 8/2015 | Viswanath et al. | |
| 2015/0271779 A1 | 9/2015 | Alavudin | |
| 2016/0371760 A1* | 12/2016 | Celorio-Martinez | G06Q 30/0631 |

OTHER PUBLICATIONS

Ferrer-Vidal, Antonio, Integration of Sensors and RFID's on Ultra-Low-Cost-Paper-Based=Substrates for Wireless Sensor Networks Applications, Jan. 22, 2007, 2006 2nd IEEE Workshop on Wireless Mesh Networks, pp. 126-128 (Year: 2007).

\* cited by examiner

ITEM ORDERING FROM AN EMBEDDED ORDERING DEVICE

PRIORITY CLAIM

This application is a Divisional of U.S. patent application Ser. No. 14/802,773, filed Jul. 17, 2015, and titled "Printed Material With an Embedded Ordering Device," the contents of which are herein incorporated by reference.

BACKGROUND

Traditionally, printed material includes advertisements that are designed to promote an item and encourage viewers of the advertisement to sample or order the advertised item. To obtain a sample and/or order the advertised item, the viewer must utilize a channel other than the advertisement. For example, to obtain the advertised item, the user would need to physically travel to a seller (e.g., retail store) to obtain the item, visit a website of the seller and submit delivery information so that the item can be delivered to the viewer, email the seller and request delivery of the item to a provided delivery address, or telephone the seller and request delivery of the item to a provided delivery address. In recent years, some advertisements include a visual identifier, such as a barcode or a quick response ("QR") code that a user can scan with their phone or other portable device to obtain additional information about the item and/or be directed to a website of the seller of the item. However, to obtain the item, or a sample thereof, the viewer of the advertisement must still provide, among other information, a delivery address and submit a request for the item. Some printed material advertisements, such as perfume and cologne advertisements, include a fold-out strip on the advertisement that includes a sample of the fragrance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, wired, wireless, or electrical.

DETAILED DESCRIPTION

This disclosure describes systems, methods and arrangements for enabling fulfillment of items from printed materials. When printed material is generated it includes an embedded ordering device ("EOD") that can be activated by a user that is viewing the printed material. Upon activation, the EOD connects to a wireless network and sends unique identifier data to a fulfillment service. The fulfillment service, upon receiving the unique identifier data, determines an item associated with the unique identifier and a delivery destination (e.g., the address to which the printed material was delivered) and fulfills the item to the delivery destination.

For example, if a user subscribes to a print magazine (Magazine A) that is delivered to their home address each month, one or more pages of the sheets of printed material in the print magazine may include an embedded EOD. Each EOD includes a unique identifier and a sensor that may be activated by the user. Prior to delivery of the print magazine to the customer, an item advertised on a sheet of printed material that includes an EOD is associated with the unique identifier. Likewise, the delivery destination or another destination specified by the user, is associated with the unique identifier. The association between the unique identifier, item, and delivery destination is maintained in one or more data stores.

When the user receives the print magazine and views the sheet of printed material that includes an embedded EOD, the user may activate the sensor (e.g., by pressing a sensor located on the sheet of printed material). Upon activation, the EOD initiates a connection with a wireless network (e.g., the Wi-Fi network at the user's home) and wirelessly sends unique identifier data to the fulfillment service. The fulfillment service, upon receiving the unique identifier data, determines the associated item and delivery destination and causes the associated item to be fulfilled to the delivery destination.

By embedding an EOD in the printed material a user can request delivery of the advertised item from the printed material and without having to utilize another channel (e.g., physical store, website, email, phone).

Figure 1:
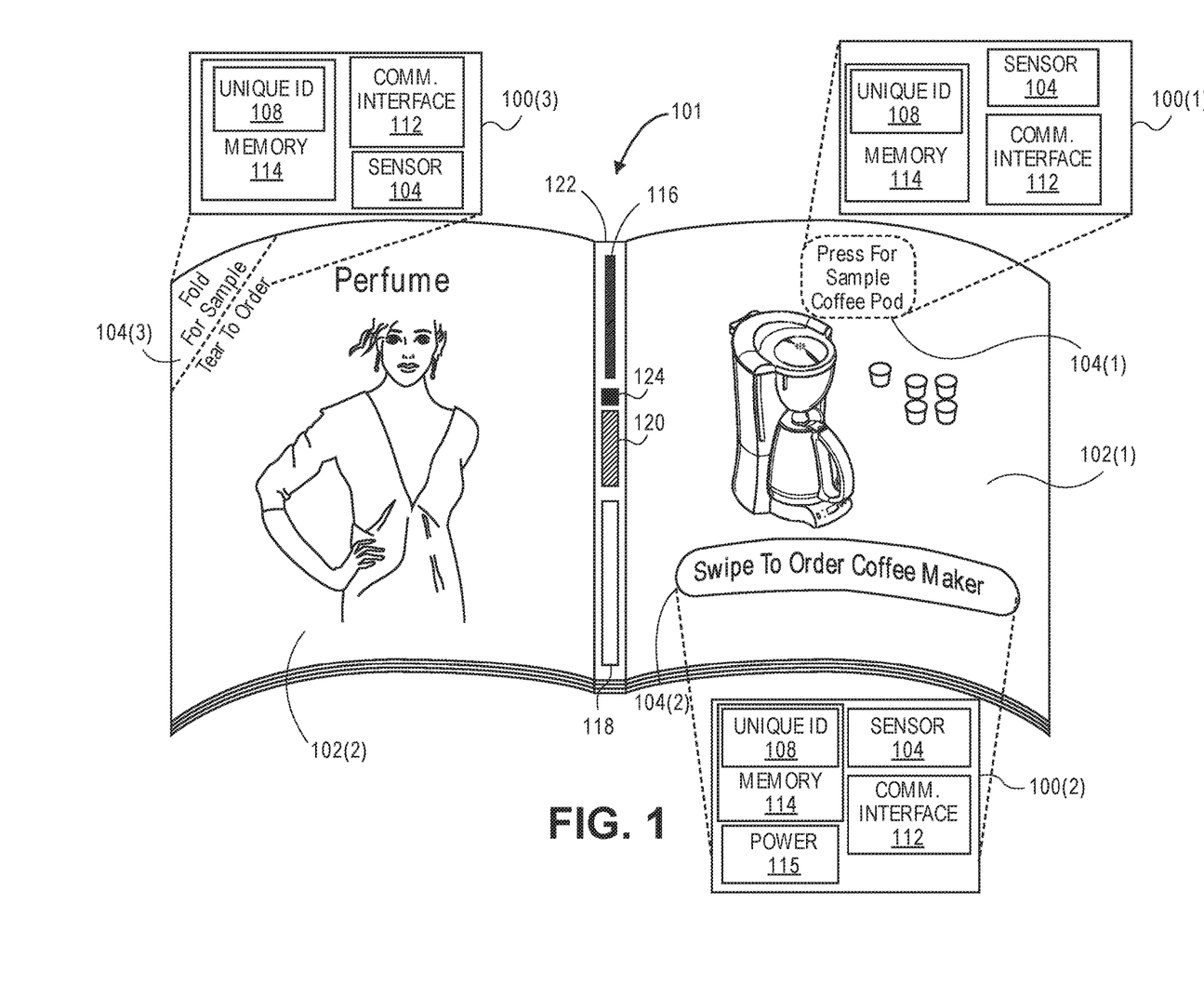
FIG. 1 is a block diagram illustrating printed material with embedded ordering devices, according to an implementation.

FIG. 1 is a block diagram illustrating printed material 101 with embedded ordering devices 100, according to an implementation. As illustrated, printed material may be any form of physical material, such as a sheet or page within a magazine, book, map, flyer, a poster, a portion of a package (e.g., a shipping box, an item package or overwrap, a portion of an item), etc., upon which information is printed. The printed material may be paper, cardboard, plastic, wood, and/or any other physical media upon which information may be presented. The information presented on the printed material may include an advertisement, promotion, review, discussion, or any other form of information about an item that a user may want to order (e.g., order a free sample, purchase, lease, borrow, rent). For example, as illustrated in FIG. 1, a first sheet 102(1) of printed material 101 includes an advertisement for a coffee maker. Likewise, the second sheet 102(2) of the printed material 101 includes an advertisement for perfume.

In the first sheet 102(1) of printed material 101, the sheet 102(1) includes multiple EODs 100(1), 100(2), each EOD corresponding to a different advertised item. Specifically, in this example, the first EOD 100(1) is associated with the item coffee pods and enables a user to request a sample of coffee pods (sample item). The second EOD 100(2) is associated with the item coffee maker and enables a user to request to purchase a coffee maker (pay item). Any number, position and/or configuration of EODs may be included on a single sheet of printed material. As used herein, a sample item is any item that may be fulfilled without charging a user a fee for the item. A pay item, as used herein, is any item in which a user pays a fee for the item (e.g., purchase, lease, rental of an item). Likewise, an item, as used herein, may be a physical item, a digital item, a service, etc.

Each EOD 100 includes at least a memory 114 that stores unique identifier data 108, a sensor 104, and a communication interface 112. In some configurations, the EOD may include additional components, such as a power supply 115, audio output, haptic output, etc. Likewise, the memory 114 may include additional information beyond the unique identifier data. For example, the memory 114 may be configured to maintain a user identifier, delivery destination information, supplementary criteria (discussed below), etc.

The memory 114 may be any form of memory, such as Flash memory, static-random access memory (SRAM), read-only memory (ROM), random access memory (RAM), erasable programmable read-only memory (EPROM), erasable programmable read-only memory (EEPROM), and/or other forms of tangible non-transitory computer-readable media to the extent that non-transitory computer-readable media exclude media such as energy, carrier signals, electromagnetic waves, and signals per se.

The unique identifier data 108 is any combination of numbers, characters, symbols, etc. that can be maintained in the memory 114, transmitted, and used to uniquely identify an item. For example, a unique identifier may be a Universal Unique Identifier (UUID), which is a 128-bit number, a randomly generated number, etc. In some implementations, the unique identifier may be a combination of identifiers that together form a unique identifier. For example, the unique identifier may be a combination of an identifier of the EOD, an identifier associated with the printed material and/or an identifier associated with a sheet 102 of the printed material 101.

The sensor 104 may be any form of sensor that may be activated by a user. For example, the sensor may be a capacitive touch sensor, a pressure sensor, an electric current sensor, a thermal sensor, a circuit, etc. In some implementations, the sensor may be activated by manipulation of the sensor by the user. For example, the sensor may be configured so that a circuit is completed and the EOD activated in response to a user folding the sheet of printed material, tearing off a portion of the sheet of printed material, touching a front of the sheet of printed material and a back of the sheet of printed material at approximately the same time, the user placing multiple fingers on the sheet of printed material, removing a tab from the printed material, etc.

The communication interface 112 may be any form of communication interface that may be used to initiate or enable wireless communication (direct or indirect) between the EOD and a fulfillment service. In some implementations, the communication interface may be an antenna. In other implementations, the communication interface may be a connection from the EOD to an antenna 116 included at another location of the printed material. In some implementations, a portion of the EOD may utilize or include a radio-frequency identification ("RFID") tag, near field communication ("NFC"), Bluetooth, Wi-Fi, etc.

In some implementations, connectivity (e.g., electrical connectivity) between the various components of the EOD, such as the memory 114, sensor 104, and/or communication interface may be enabled through the printed material, such as the sheet 102(1) of the printed material 101. For example, one or more portions of the sheet 102(1) of the printed material 101 may include an electric paint which provides electrical connections between the components of the EOD.

Likewise, in some implementations, the printed material 101 may include additional components that may be utilized by one or more of the EODs 100. For example, as illustrated in FIG. 1, the printed material 101 includes a binder 122 to which each sheet 102 of the printed material 101 is affixed. The binder 122, in this example, includes an antenna 116, power supply 118, a memory 120, and a processor 124. In other implementations, additional or fewer components may be included as additional components of the printed material 101. For example, in some implementations, the EOD and/or the printed material may receive power through a wireless connection with a provisioned device.

When an EOD 100 is activated by a user, the EOD 100 may couple with one or more of the additional components of the printed material. For example, the communication interface 112 of the EOD may couple with the antenna. Likewise, the EOD 100 may also couple with one or more of the power supply 118, the memory 120 and/or the processor 124. In some implementations, when the user activates the sensor of the EOD it may complete a circuit between the EOD 100 and the additional components of the printed material 101, thereby enabling coupling and communication between the EOD 100 and the additional components of the printed material 101.

In some implementations, the printed material may include a microphone (not shown) that is enabled when the sensor 104 is activated so that the user can provide additional information (e.g., delivery destination, verbal order confirmation, network identification, network password, order request, and/or other types of information). The audible information received from the microphone may be stored in a memory of the EOD 100 and/or the memory 120 of the printed material. Likewise, the received audible information may be used to connect an EOD and/or the printed material to a network (e.g., if the user audibly provides network information, such as a password) and/or the audible information may be included in the communication between an EOD and the fulfillment service.

Returning to FIG. 1, the first EOD 100(1) may be activated by a user pressing the sensor 104(1) presented with the advertisement and/or a user may activate the EOD 100(2) presented with the advertisement by swiping their finger across sensor 104(2) presented with the advertisement. In this example, the sensors 104(1), 104(2) are capacitive sensors, such as a printed ink capacitive sensor, that will detect an input from an object that is conductive (e.g., a human's finger) or has a dielectric different from that of air.

In another implementation, such as that illustrated with respect to EOD 100(3), the sensor may be a portion of the circuit and it may be activated by a user manipulating the sheet 102(2) of printed material. In this example, the EOD 100(3) has two modes of operation depending on how the sensor is activated. To initiate an order of a sample of the item, the sensor 104(3) is activated by the user folding a corner of the sheet 102(2). To initiate a request for a pay item, the sensor 104(3) is activated by the user tearing off the corner of the sheet 102(2). To initiate a request for a sample item, the sensor 104(3) is activated by the user folding the corner of the sheet 102(2) of printed material. In such a configuration, the EOD 100(3) maintains two unique identifiers, one that is transmitted to initiate fulfillment of a sample item, and a second that is transmitted to initiate a purchase and fulfillment of a pay item, as discussed further below. Alternatively, a single unique identifier may be maintained and a flag or other indicator may be transmitted with the unique identifier data indicating whether a sample item or pay item is to be fulfilled to a delivery destination. In other implementations, other forms of sensors may be used to activate an EOD 100.

Figure 2A:
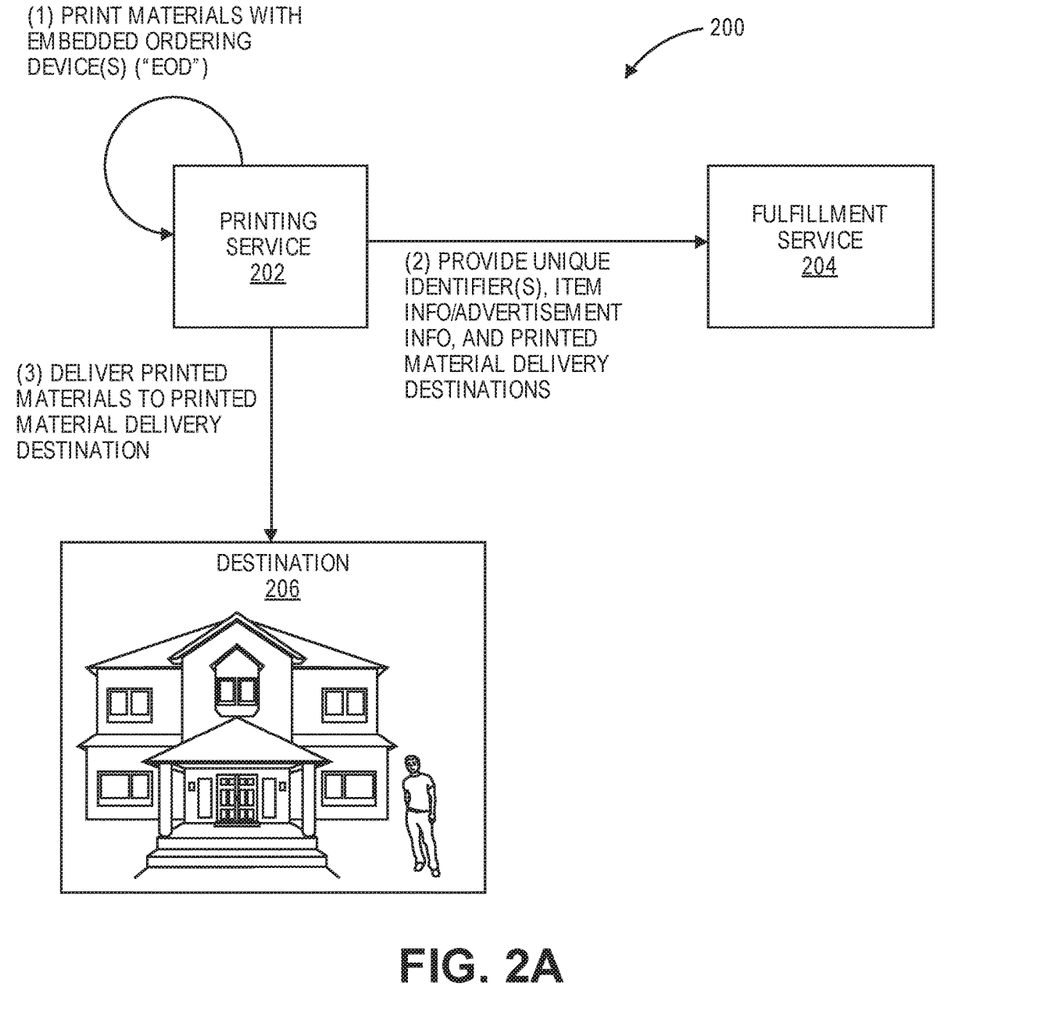
FIGS. 2A-2B is an illustration of an environment in which an item is fulfilled in response to activation of an embedded ordering device, according to an implementation.
Figure 2B:
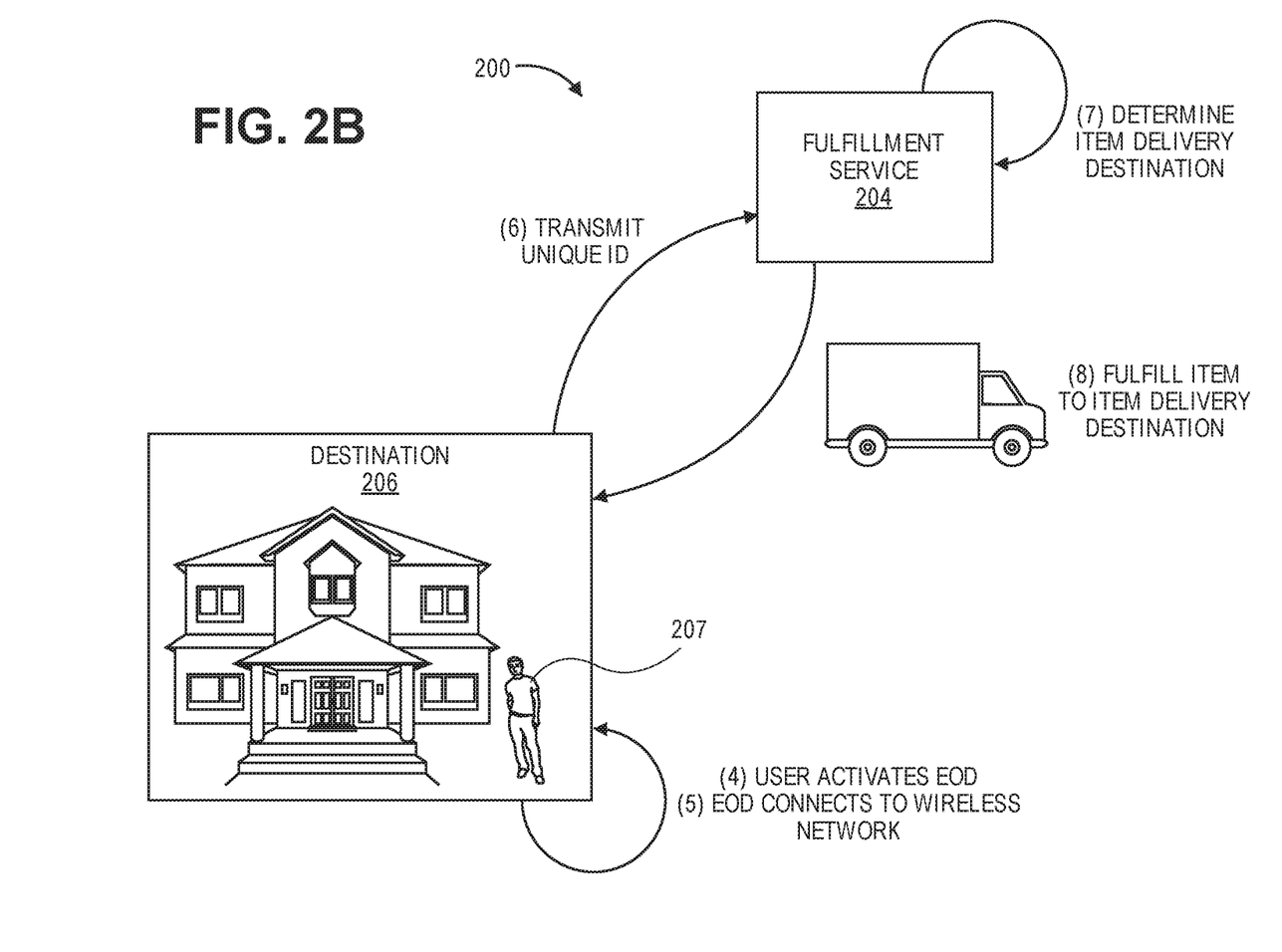

FIGS. 2A-2B is an illustration of an environment 200 in which an item is fulfilled in response to activation of an EOD that is embedded into a printed material, according to an implementation. In this example, printed materials that include one or more EODs are generated at a printing service 202. As is typical with many printed materials, thousands, or more copies of the printed material are often generated. In such an instance, as the printed materials are generated with EODs, the EODs are each assigned a unique identifier and the item advertised on the sheet of the printed material corresponding to each EOD is determined and associated with the unique identifier. As discussed above, the unique identifier may be unique to the EOD alone or may be a combination of an identifier of the EOD, an identifier associated with the printed material, and/or an identifier associated with a sheet of the printed material. For example, the EOD may have a first series of numbers (e.g., 000001), the sheet of the printed material in which the EOD is embedded may have an identifier (002), and each instance of the printed material (e.g., particular magazine) into which the EOD is included may have an identifier (e.g., AAAA). Combining the identifiers provides a unique identifier (e.g., AAAA002000001) that can also be utilized to obtain information about the printed material and/or the sheet of the printed material in which the EOD is embedded.

As the printed materials are generated with EODs, an association between the unique identifiers and item advertised on the sheet in which the EOD is embedded are maintained. Likewise, if printed material delivery destinations are known, the printed material delivery destination is also associated with the unique identifier. The printing service 202 provides to the fulfillment service 204 the association between the unique identifiers, the items, and the printed material delivery destinations, if known. A delivery destination may include a delivery address and/or an identification of a person to whom the printed material is being delivered.

While this example illustrates the printing service 202 and the fulfillment service 204 as separate, in some implementations the printing service 202 and the fulfillment service 204 may be the same entity. Alternatively, there may be multiple fulfillment services and, depending on the EOD activated, the activated EOD may initiate transmission of the unique identifier data to a different fulfillment service. Likewise, there may be multiple printing services that generate printed material and that provide mappings of unique identifier, items, and delivery destination to the fulfillment service 204.

In addition to providing the mappings between the unique identifiers, items, and printed material delivery destinations, the printing service 202 delivers or causes to be delivered, the printed materials to printed material delivery destinations, such as the destination 206. As delivery destinations are determined, the printing service 202 provides to the fulfillment service 204 an updated mapping between the unique identifiers, items, and delivery destinations. Determination of a delivery destination for a particular instance of a printed material may not be known until the instance of the printed material is in route to the delivery destination and/or arriving at the delivery destination. For example, if multiple copies of a printed material are generated they may be stocked in inventory and when a copy of the printed material is to be delivered to a printed material delivery destination, the next instance of the printed material is obtained from inventory. Depending on the delivery implementation, the specific instance of the printed material may not be known until later in the delivery process. Regardless of when the instance of the printed material is determined and associated with a printed materials delivery destination, when the mapping is updated, the mapping is provided to the fulfillment service.

Turning now to FIG. 2B, at some point after the printed material is delivered to the destination 206, a user 207 activates a sensor of an EOD included in the printed material. When a sensor is activated, the corresponding EOD initiates a connection to a wireless network. For example, the EOD may connect to a wireless network (e.g., Wi-Fi network) at the destination 206. In some implementations, the printing service 202, the fulfillment service 204, and/or the user 207 may provide wireless network information (e.g., configuration, identification, password) to the EOD and/or the printed material to enable connection between the EOD and the wireless network. For example, the user, in advance of receiving the printed material, may provide wireless network information to the printing service 202 and/or the fulfillment service 204 and that information may be provided by the printing service 202 and/or the fulfillment service 204 to the EOD and/or the printed material and stored in memory of the OED and/or the printed material.

In another implementation, the EOD, upon activation, may search for a provisioned device that either maintains wireless network information and/or is connected to the wireless network. A provisioned device may be any device with which the EOD and/or the printed material is capable of wirelessly communicating and that either maintains wireless network information, is connected to the wireless network, maintains user information and/or maintains item delivery destination information. For example, a provisioned device may be a cellular telephone, a Wi-Fi hotspot, a wireless router, a connected television, a tablet, a computer, or any other device. In some implementations, the provisioned device may already maintain an association with the user, the printing service and/or the fulfillment service. In such an implementation, the EOD may provide an identifier or key that indicates to the provisioned device that the EOD is also associated with the printing service and/or the fulfillment service. The provisioned device, upon receiving the key may provide wireless network information and/or facilitate a wireless network connection between the EOD and the wireless network.

In some implementations, the provisioned device may provide user information and/or delivery destination information to the EOD. For example, the provisioned device may be a wirelessly enabled payment instrument (e.g., RFID enabled credit card) that includes a memory storing user information and/or item delivery destination information. When the EOD is searching for a provisioned device it may detect and communicate with the provisioned device to obtain user information and/or delivery destination information. The EOD may then include that information in a wireless transmission with the unique identifier data.

In still another implementation, the EOD may search for any available wireless network with which it can connect and transmit information. For example, an available wireless network may be an unsecured Wi-Fi network, a cellular network, etc.

Upon connecting with a wireless network, the EOD initiates a transmission of the unique identifier data such that the unique identifier data is received by the fulfillment service 204. Any one of a variety of transmission protocols may be utilized to transmit the unique identifier data to the fulfillment service 204.

The fulfillment service 204, upon receiving a wireless transmission that includes unique identifier data, utilizes the mapping information provided by the printing service 202 to determine an item associated with the unique identifier represented by the unique identifier data and a delivery destination to which an instance of the item is to be delivered. As discussed further below, the delivery destination for the item may be the same destination as the printed material delivery destination or another delivery destination specified by the user. For example, if the user is known to the fulfillment service and the user maintains a user profile with the fulfillment service, the user profile may specify one or more item delivery destinations for delivery of items in response to an activation of an EOD. Likewise, as discussed further below, the fulfillment service may determine whether the EOD corresponds to a request for a sample item or a pay item. If the item is a pay item, the user is charged for the item.

Finally, upon determining an item delivery destination and optionally charging the user for the item, the item is fulfilled to the item delivery destination. Fulfillment of the item to the item delivery destination may be accomplished using any form of transportation, such as a shipping carrier, ground based vehicle, unmanned ground based vehicle, aerial vehicle, unmanned aerial vehicle, etc.

While the above example describes wireless transmission of the unique identifier data from the EOD to the fulfillment service, in some implementations, the transmission may not be wireless. For example, the sensor and/or the printed material may include a physical contact port to which a user may physically touch or connect a transmission device. Upon contact of a transmission device with the physical contact port, the EOD is activated and the unique identifier data is transmitted through the port to the transmission device.

Figure 3:
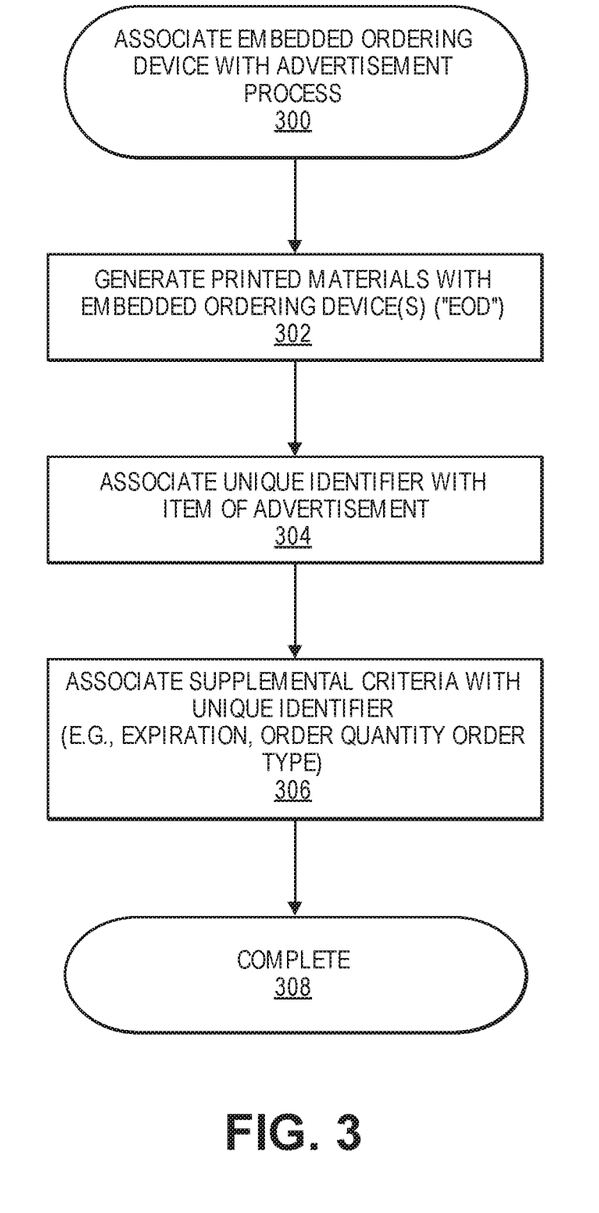
FIG. 3 is a flow diagram of an example process for associating an embedded ordering device with an advertisement for an item, according to an implementation.

FIG. 3 is a flow diagram of an example process 300 for associating an embedded ordering device with an advertisement for an item, according to an implementation. The example process of FIG. 3, and each of the other processes discussed herein, may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, circuits, and the like that perform particular functions or implement particular data types.

The computer-readable media may include non-transitory computer-readable storage media, which may include hard drives, floppy diskettes, optical disks, CD-ROMs, DVDs, such as Flash memory, static-random access memory (SRAM), read-only memory (ROM), random access memory (RAM), erasable programmable read-only memory (EPROM), erasable programmable read-only memory (EEPROM), and/or other forms of tangible non-transitory computer readable media to the extent that non-transitory computer-readable media exclude media such as energy, carrier signals, electromagnetic waves, and signals per se. Finally, the order in which the operations are described is not intended to be construed as a limitation, and any number of the described operations can be combined in any order and/or in parallel to implement the routine. Likewise, one or more of the operations may be considered optional.

The example process 300 begins by generating printed materials with one or more EODs, as in 302. As the printed materials are generated, the sheet of printed material that includes one or more EODs, or each sheet of a multi-sheet printed material that includes one or more EODs is generated that includes information about an item. An association between the item and the unique identifier of the EOD embedded in the sheet of the printed material on which the item information is included is established and stored in a mappings data store, as in 304. Likewise, supplement criteria for the item may also be determined and associated with the unique identifier and maintained in the mappings data store, as in 306. Supplemental criteria may include, for example, an EOD expiration date, an order quantity, an order frequency, an order type, etc. An EOD expiration date may specify a date until which the EOD is valid. If the EOD is activated after the expiration date, it will not result in a delivery of an instance of the item. An order quantity may specific a total number or quantity of items that may be delivered in response to activation of the EOD. For example, the order quantity may specify that the item (e.g., a sample of the item) can only be delivered a total of three times in response to activation of the EOD. Similarly, the order frequency may specify a frequency with which the item may be ordered. For example, the order frequency may specify that a second item cannot be ordered by activation of the EOD until after a defined period of time following the order of the first item using the EOD. An order type may specify whether the order is for a sample item or for a pay item. As will be appreciated, fewer, additional or different types of supplemental criteria may be maintained.

Upon generating an association between the unique identifier, item, and any supplemental criteria, the example process 300 completes, as in 308.

Figure 4:
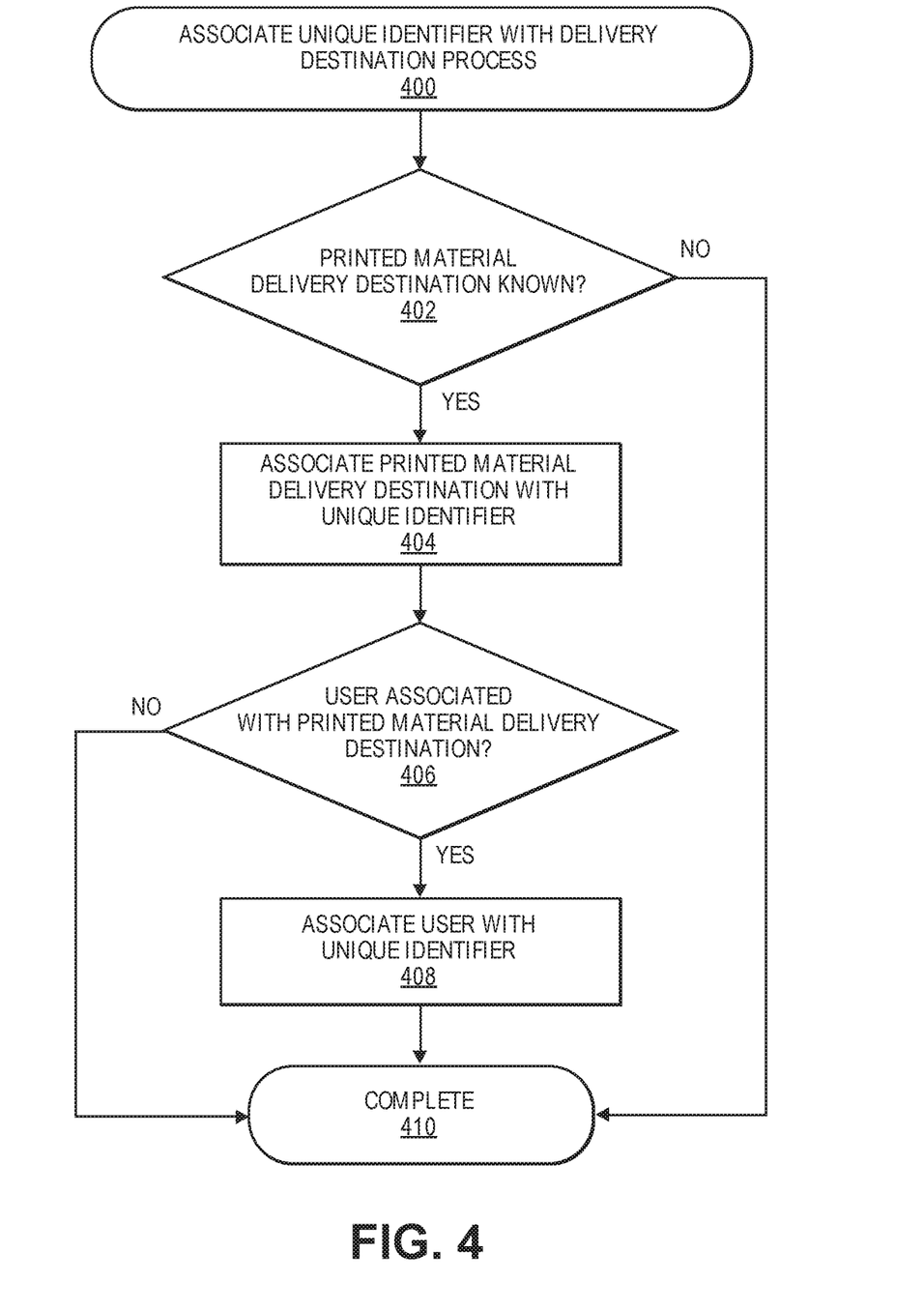
FIG. 4 is a flow diagram of an example process for associating an embedded ordering device unique identifier with a delivery destination, according to an implementation.

FIG. 4 is a flow diagram of an example process 400 for associating a unique identifier stored in an EOD with a delivery destination, according to an implementation. The example process 400 begins by determining if a printed material delivery destination is known, as in 402. As discussed above, a printed material delivery destination generally becomes known when the printed material is allocated for delivery to that delivery destination. Prior to allocation, the printed material delivery destination may not be known.

If the printed material delivery destination for the printed material that includes the EOD is known, the unique identifier and the printed material delivery destination are associated and the association is maintained in an associations data store, as in 404. A determination may also be made as to whether a user associated with the printed material delivery destination is known, as in 406. For example, a user may subscribe to a printed material and as part of that subscription may provide user identifying information (e.g., user name, payment details) and/or create a user account and/or user profile that is utilized to maintain information about the user. Alternatively, the user may be a customer of another service affiliated with the printing and/or delivery of printed material and the user information may be determined from the affiliated service. For example, the user may be a customer of an electronic commerce (e-commerce) website that provides fulfillment and/or printing of the printed material. In such an example, the user may create a user account with the e-commerce website that includes user information, payment information, and/or a delivery destination that has been specified for the printed material delivery destination.

If it is determined that a user is known or associated with the printed material delivery destination, the user is associated with the unique identifier, as in 408. After associating the user with the unique identifier, if it is determined that the printed material delivery destination is not known or, if it is determined that there is no known user associated with the printed material delivery destination, the example process 400 completes, as in 410.

Figure 5:
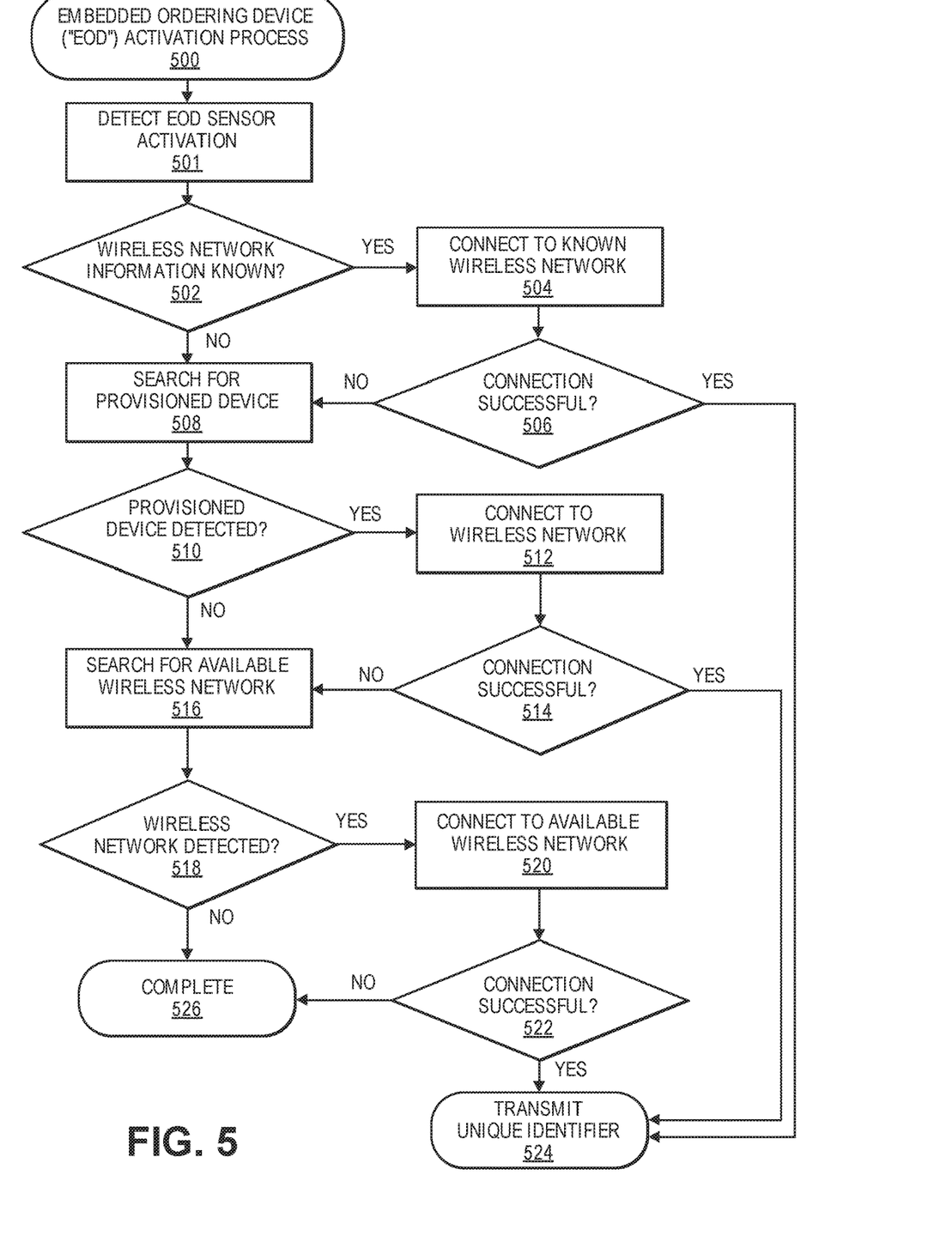
FIG. 5 is a flow diagram of an example embedded ordering device activation process, according to an implementation.

FIG. 5 is a flow diagram of an example embedded ordering device activation process 500, according to an implementation. The example process 500 begins by detecting an activation of an EOD sensor, as in 501. As discussed above, an EOD sensor may be activated by, for example, a user touching the sensor, folding a portion of a sheet of the printed material in which the EOD is embedded, tearing the sheet of printed material in which the EOD is embedded, touching a front of the sheet of printed material and a back of the sheet of printed material at approximately the same time, the user placing multiple fingers on the sheet of printed material, removing a tab from the printed material, etc.

Upon detecting an activation of an EOD sensor, a determination is made as to whether wireless network information is known, as in 502. Wireless network information is known if it is stored in the memory of the EOD and/or stored in a memory of the printed material. In some implementations, a user may provide, prior to a printed material being delivered, wireless network information that includes information needed to connect to a wireless network. In such an implementation, when the printed material is allocated for delivery to the printed material delivery destination, the wireless network information may be provided to the printed material and stored in the memory of the printed material and/or in the memory of the EOD. In another example, if the printed material has previously connected to the wireless network (e.g., in response to a prior activation of the EOD or another EOD included in the printed material), the wireless network information may be stored in the memory of the printed material and/or memory of the EOD.

If it is determined that wireless network information is known, the EOD attempts to connect to a wireless network using the known wireless network information, as in 504. A determination is made as to whether the connection was successful, as in 506.

If it is determined that the wireless network connection was not successful, or if it is determined that wireless network information is not known, the example process searches for a provisioned deice, as in 508. In one implementation, the EOD may transmit a beacon with an identifier or security token for a defined period of time. If a provisioned device detects the beacon it will receive the identifier/security token, verify the EOD and provide wireless network information back to the EOD so that the EOD can connect to the wireless network. In another implementation, if a provisioned device is detected, the EOD may connect to the wireless network through the provisioned device.

After searching for a provisioned device, a determination is made as to whether a provisioned device was detected, as in 510. If it is determined that a provisioned device was detected, the EOD attempts to connect to the wireless network using the wireless network information received from the provisioned device or attempts to connect to the wireless network through the provisioned device, as in 512. For example, the EOD may establish a connection with the provisioned device using a first wireless connection (e.g., Bluetooth, Wi-Fi, NFC) and the provisioned device may provide a connection to the wireless network. After attempting to connect to the wireless network, a determination is made as to whether the connection using the wireless network information received from the provisioned device was successful or if connecting to the wireless network via the provisioned device was successful, as in 514.

If it is determined in decision block 514 that the wireless network connection was not successful, or if it is determined at decision block 510 that a provisioned device was not detected, the example process 500 searches for any available wireless network, as in 516. For example, the example process may search for an unsecure wireless network. A determination is then made as to whether an available wireless network connection was detected, as in 518. If an available wireless network is detected, a connection to the available wireless network is attempted, as in 520. Upon attempting to connect to an available wireless network, a determination is made as to whether the connection was successful, as in 522. If it is determined that the connection to an available wireless network was not successful, or if it is determined at decision block 518 that there is no available wireless network, the example process 500 completes, as in 526. In some implementations, unique identifier data representative of the unique identifier may be stored in a memory of the printed material and when connection with a wireless network is established, the unique identifier data may be transmitted.

If it is determined in any of decision blocks 506, 514, or 522 that a wireless network connection was successfully established, the example process transmits the unique identifier data stored in the EOD over the wireless network connection such that it is received by a fulfillment service, as in 524.

Figure 6:
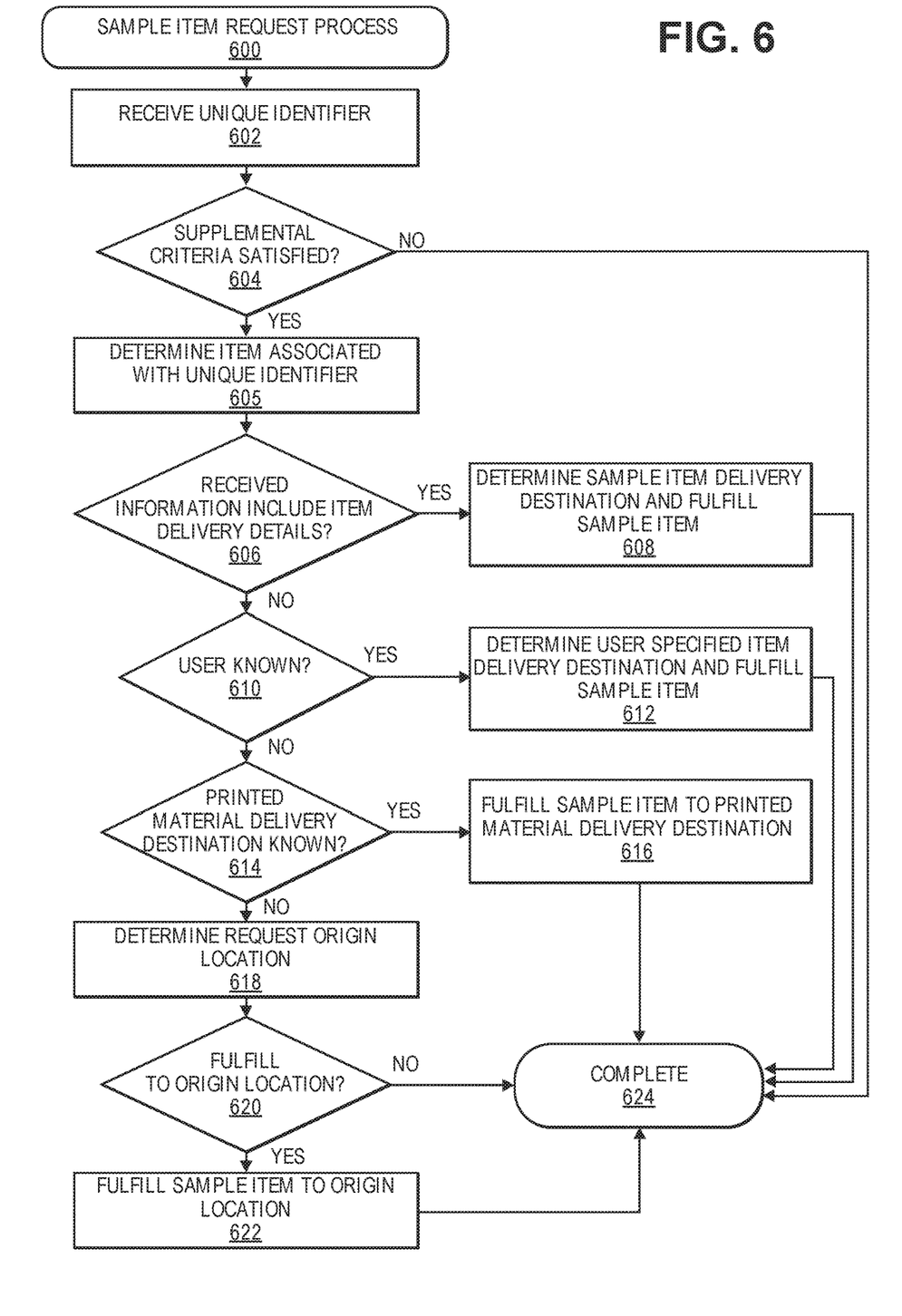
FIG. 6 is a flow diagram of an example sample item request process, according to an implementation.

FIG. 6 is a flow diagram of an example sample item request process 600, according to an implementation. The example process 600 begins upon receipt of unique identifier data sent from an EOD, as in 602. Upon receiving unique identifier data, a determination is made as to whether any supplemental criteria associated with the unique identifier represented by the unique identifier data is satisfied, as in 604. As discussed above, supplemental criteria may include, for example, an EOD expiration date, an order quantity, an order frequency, an order type, etc. If it is determined that the supplemental criteria are satisfied, the item associated with the unique identifier is determined, as in 605. As discussed above, a mapping or association between the unique identifier and an item advertised on a sheet of printed material in which the EOD is embedded is maintained in an association data store.

In addition to determining the item associated with the unique identifier, a determination is made as to whether the received information includes item delivery details, as in 606. If the EOD is connecting to a wireless network through a provisioned device, and/or if the EOD has been provided information from the user or a provisioned device, the transmission that includes the unique identifier may include additional delivery details. For example, if the EOD is connecting to the wireless network through another provisioned device, when activated, the EOD may send to the provisioned device the unique identifier data. The provisioned device may include delivery details and send the unique identifier data and included delivery details to the fulfillment service.

In some implementations, user information and/or delivery information may be obtained from a payment instrument If it is determined that the received information includes delivery details, the delivery details are utilized to determine a delivery destination and to initiate fulfillment of an instance of the sample item to the delivery destination, as in 608. The delivery details may identify a user specified item delivery destination or may identify the user. If the user is identified, a user profile associated with the user and maintained in a user profile data store may be queried to determine an item delivery destination specified by the user.

If it is determined at decision block 606 that the received information does not include delivery details, a determination is made as to whether the user associated with the printed material delivery destination is known, as in 610. As discussed above, the user associated with the printed material delivery destination may be determined from a user profile that includes the printed material delivery destination and/or the user may provide user identification information when requesting or ordering the printed material (e.g., subscribing to a magazine). If it is determined that the user associated with the printed material delivery destination is known, a user specified item delivery destination is determined and used to initiate fulfillment of an instance of the sample item to the user specified item delivery destination, as in 612. For example, a user may specify an item delivery destination to which items ordered using an EOD are to be delivered. The user specified item delivery destination may be maintained in a user profile associated with the user.

If it is determined at decision block 610 that the user is not known, a determination is made as to whether the printed material delivery destination is known, as in 614. As discussed above, the printed material delivery destination is the delivery destination for the printed material. If it is determined that the printed material delivery destination is known, the printed material delivery destination is used as the item delivery destination and fulfillment of an instance of the item to that destination is initiated, as in 616. While a printed material delivery destination will be known for delivery in response to a user request, order or direct delivery of the printed material to a user, some forms of printed material may be provided in bulk (e.g., newsstands, stores) and retrieved by users without the users providing any information. In such examples, the printed material delivery destination may not be known. If it is determined at decision block 614 that the printed material delivery destination is not known, an origin location of the request for the sample item is determined, as in 618. The origin location may be determined, for example, based on a Wi-Fi network identifier included in the wireless transmission, a Bluetooth identifier included in the wireless transmission, a near-field communication identifier included in the wireless transmission, an internet protocol address included in the wireless transmission, global positioning system ("GPS") coordinate information, etc.

Upon determining the origin location, a determination is made as to whether the sample item is to be fulfilled to the determined origin location, as in 620. It may be determined to fulfill the sample item to the origin location if the fulfillment can be narrowed down to a user or group of users at the origin location. For example, if the origin location is a private residence, it may be determined that the sample item is to be fulfilled to the origin location because the origin location corresponds to a small group of users. In contrast, if the origin location is a public facility (e.g., library, park), a business address that includes a large number of employees, or other location that could be associate with any one of a large number of individuals, it may be determined that the sample item is not to be delivered to the origin location.

If it is determined that the sample item is to be delivered to the determined origin location, the origin location is used as the item delivery destination and fulfillment of an instance of the sample item to the item delivery destination is initiated, as in 622. However, if it is determined that the sample item is not to be delivered to the determined origin location, the example process completes, as in 624. If it is determined at decision block 604 that one or more of the supplemental criteria are not satisfied, the example process 600 completes, as in 624. Finally, upon initiation of delivery of an instance of the sample item in any of blocks 608, 612, 616, 622, the example process 600 completes, as in 624.

Figure 7:
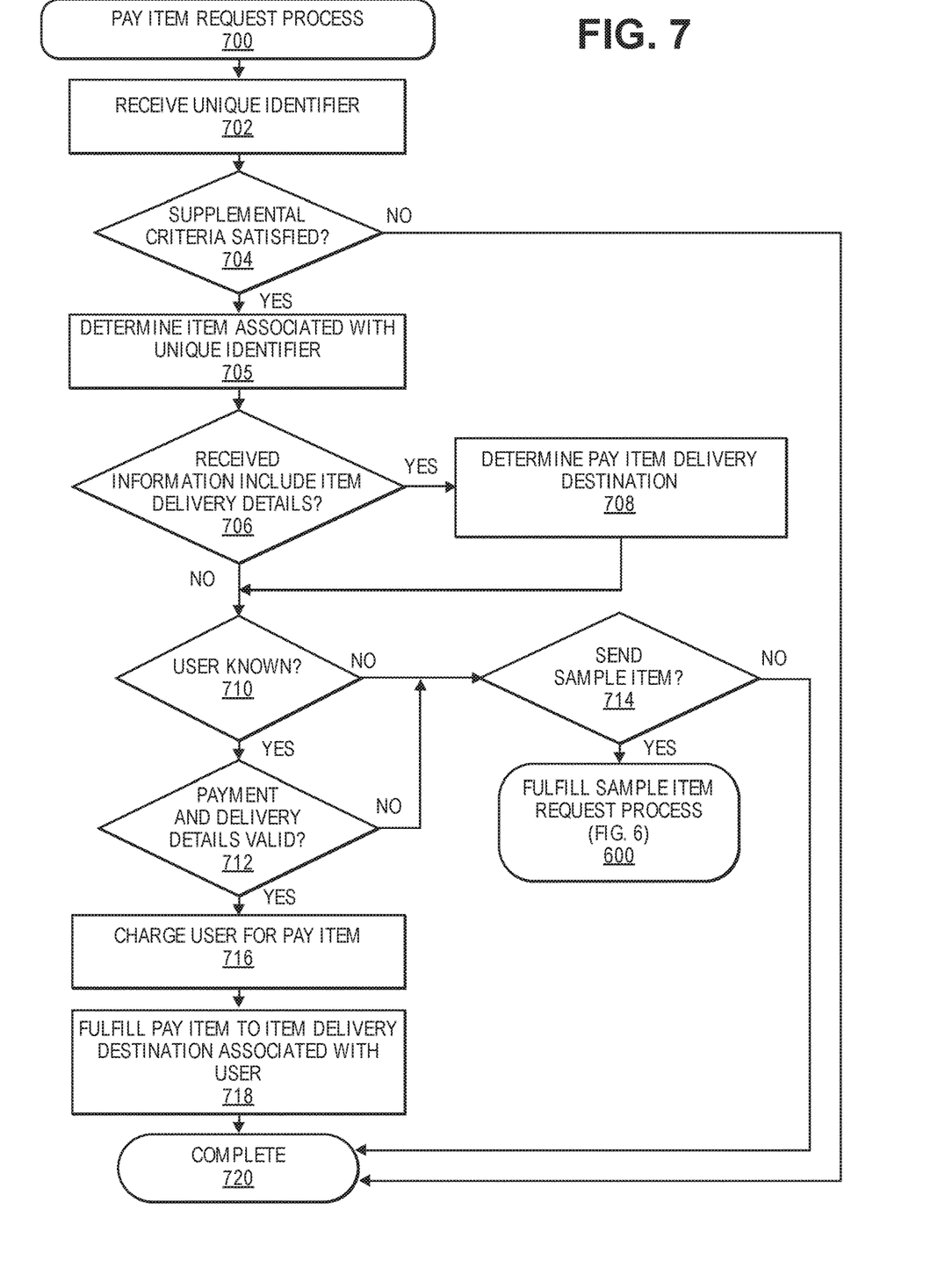
FIG. 7 is a flow diagram of an example pay item request process, according to an implementation.

FIG. 7 is a flow diagram of an example pay item request process 700, according to an implementation. The example process 700 begins upon receipt of a unique identifier data sent from an EOD, as in 702. Upon receiving a unique identifier data, a determination is made as to whether any supplemental criteria associated with the unique identifier is satisfied, as in 704. As discussed above, supplemental criteria may include, for example, an EOD expiration date, an order quantity, an order frequency, an order type, etc.

If it is determined that the supplemental criteria are satisfied, the item associated with the unique identifier is determined, as in 705. As discussed above, a mapping or association between the unique identifier and an item advertised on a sheet of printed material in which the EOD is embedded is maintained in an association data store.

In addition to determining the item associated with the unique identifier, a determination is made as to whether the received information includes item delivery details, as in 706. If the EOD is connecting to a wireless network through a provisioned device, and/or if the EOD has been provided information from the user or a provisioned device, the transmission that includes the unique identifier data may include additional delivery details. For example, if the EOD is connecting to the wireless network through another provisioned device, when activated, the EOD may send to the provisioned device the unique identifier data. The provisioned device may include delivery details and send the unique identifier data and included delivery details to the fulfillment service.

If it is determined that the received information includes delivery details, the delivery details are utilized to determine an item delivery destination and/or a user that submitted the request, as in 708. The delivery details may identify a user specified item delivery destination and/or may identify the user. If the user is identified, a user profile associated with the user and maintained in a user profile data store may be queried to determine an item delivery destination specified by the user.

If it is determined at decision block 706 that the received information does not include delivery details, or upon determination of an item delivery destination at block 708, a determination is made as to whether the user associated with the printed material delivery destination is known, as in 710. As discussed above, the user associated with the printed material delivery destination may be determined from a user profile that includes the delivery destination and/or the user may provide user identification information when requesting or ordering the printed material (e.g., subscribing to a magazine). If it is determined that the user associated with the printed material delivery destination is not known, a determination is made as to whether a sample of the advertised item should be fulfilled, as in 714. If it is determined that a sample item is to be fulfilled, the example sample item request process 600 (FIG. 6) is performed.

If it is determined that the user associated with the printed material delivery destination is known, a determination is made as to whether the payment and delivery details associated with the user are valid, as in 712. If a user account associated with the user is current, a payment instrument (e.g., credit card) has been verified and/or previously utilized by the user, and/or items have previously been delivered to the specified item delivery destination, it may be determined that the payment and delivery details are valid. If it is determined that one or more of the payment or delivery details are not valid, the example process proceeds to decision block 714 and continues as discussed above.

If it is determined that the payment and delivery details for the user are valid, the user is charged for the associated pay item, as in 716. Likewise, fulfillment of an instance of the pay item is initiated such that it is delivered to the item delivery destination associated with the user, as in 718. Finally, the example process 700 completes, as in 720.

While the above examples describe fulfillment of a sample item or a pay item to a physical destination (e.g., user's home), it will be appreciated that in some implementations the fulfillment may include digitally sending the item to a destination. As such, fulfilling or sending an item may include any form of physical delivery, digital delivery, etc. For example, an item may be sent to a destination using a traditional carrier (e.g., truck), using an unmanned aerial vehicle, using digital transmission, etc.

Figure 8:
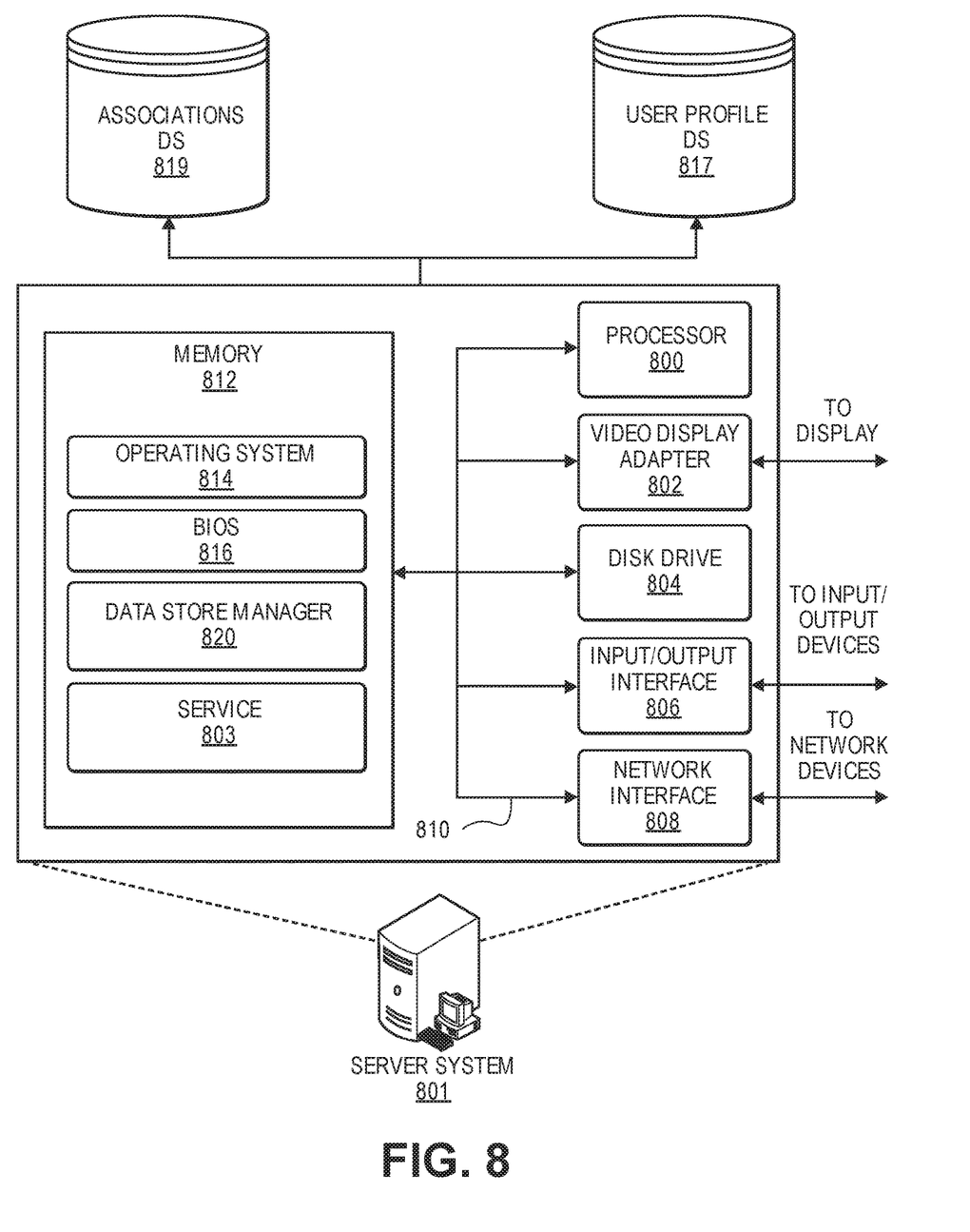
FIG. 8 is a block diagram of an illustrative implementation of a server system that may be used with various implementations.

FIG. 8 is a pictorial diagram of an illustrative implementation of a server system, such as the server system 801, which may be used in the implementations described herein. The server system illustrated in FIG. 8, or another similar server system, may be configured as the printing service and/or the fulfillment service.

The server system 801 may include a processor 800, such as one or more redundant processors, a video display adapter 802, a disk drive 804, an input/output interface 806, a network interface 808, and a memory 812. The processor 800, the video display adapter 802, the disk drive 804, the input/output interface 806, the network interface 808, and the memory 812 may be communicatively coupled to each other by a communication bus 810.

The video display adapter 802 provides display signals to a local display (not shown in FIG. 8) permitting an operator of the server system 801 to monitor and configure operation of the server system 801. The input/output interface 806 likewise communicates with external input/output devices not shown in FIG. 8, such as a mouse, keyboard, scanner, or other input and output devices that can be operated by an operator of the server system 801. The network interface 808 includes hardware, software, or any combination thereof, to communicate with other computing devices. For example, the network interface 808 may be configured to receive unique identifier data transmitted by EODs and/or printed materials, as discussed above.

The memory 812 generally comprises random access memory (RAM), read-only memory (ROM), flash memory, and/or other volatile or permanent memory. The memory 812 is shown storing an operating system 814 for controlling the operation of the server system 801. A binary input/output system (BIOS) 816 for controlling the low-level operation of the server system 801 is also stored in the memory 812.

The memory 812 additionally stores program code and data for providing network services. The data store manager application 820 facilitates data exchange between the user profile data store 817 and the associations data store 819.

As used herein, the term "data store" refers to any device or combination of devices capable of storing, accessing and retrieving data which may include any combination and number of data servers, databases, data storage devices and data storage media in any standard, distributed or clustered environment. The server system 801 can include any appropriate hardware and software for integrating with the data stores 817, 819 as needed to execute aspects of the server system 801.

The data stores 817, 819 can include several separate data tables, databases or other data storage mechanisms and media for storing data relating to a particular aspect. For example, the data stores 817, 819 illustrated include mechanisms for maintaining associations between unique identifiers, items represented or advertised on a sheet of printed material in which an EOD with the unique identifier is embedded, users, printed material delivery destination, item delivery destination, and/or supplemental criteria, etc.

It should be understood that there can be many other aspects that may be stored in the data stores 817, 819. The data stores 817, 819 are operable, through logic associated therewith, to receive instructions from the server system 801 and obtain, update or otherwise process data in response thereto.

The memory 812 may also include the service 803 (e.g., printing service, and/or fulfillment service) and/or provide one or more functions of the service 803. The corresponding service 803 may be executable by the processor 800 to implement one or more of the functions of the server system 801. In one implementation, the corresponding service 803 may represent instructions embodied in one or more software programs stored in the memory 812. In another implementation, the corresponding service 803 can represent hardware, software instructions, or a combination thereof.

It will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
   a printed material that includes:
   a first embedded ordering device ("EOD") at a first position within the printed material, wherein the first EOD includes at least a first memory that stores at least a unique identifier;
   a second EOD at a second position within the printed material that is different than the first position; and
   an antenna at a third position within the printed material that is different than the first position and the second position, wherein the antenna is configured to be selectively coupled to the first EOD or the second EOD; and a computing system that is separate from the printed material, including:
one or more processors; and
a second memory storing program instructions that, when executed by the one or more processors, cause the one or more processors to at least:
store a first association between the unique identifier and an item, wherein the unique identifier is associated with the item and corresponds to an item information presented on the printed material;
a second association between the unique identifier and a delivery destination; and
subsequent to the printed material being delivered to a printed material delivery destination:
receive data that is wirelessly transmitted by the antenna and that includes the unique identifier; and
in response to receiving the data that includes the unique identifier, cause the item to be fulfilled to the delivery destination.

2. The system of claim 1, wherein the printed material is at least one of a sheet of paper included in a magazine, a sheet of paper included in a book, a map, a poster, a flyer, a multi-sheet printed material or a portion of a package.

3. The system of claim 1, wherein the program instructions that, when executed by the one or more processors, further cause the one or more processors to at least:
determine a user profile corresponding to the printed material delivery destination; and
determine that the delivery destination is an item delivery destination associated with the user profile.

4. The system of claim 3, wherein:
the program instructions that, when executed by the one or more processors, further cause the one or more processors to at least determine an origin location of the data based at least in part on an identifier included in the data; and
the program instructions that, when executed by the one or more processors to cause the one or more processors to determine that the delivery destination is the item delivery destination, further include instructions that, when executed by the one or more processors, further cause the one or more processors to at least determine the delivery destination corresponding to the origin location.

5. The system of claim 1, wherein the program instructions that, when executed by the one or more processors, further cause the one or more processors to at least:
charge a fee for the item.

6. A method comprising:
including a first embedded ordering device ("EOD") in a first portion of a printed material, wherein the first EOD includes:
a first memory storing a unique identifier;
a communication interface; and
a circuit coupled to the communication interface that, when the first EOD is activated, is configured to at least:
initiate a wireless connection using the communication interface; and
send the unique identifier for wireless transmission;
including a second EOD in a second portion of the printed material;
including an antenna in a third portion of the printed material, wherein antenna is configured to be selectively coupled to the first EOD or the second EOD;

at a computing system that is separate from the printed material:
storing, in a second memory included in the computing system, a first association between the unique identifier and an item;
storing, in the second memory, a second association between the unique identifier and a delivery destination; and
subsequent to the printed material being delivered to a printed material delivery destination:
receiving data included in a wireless transmission sent by the antenna, wherein the data includes the unique identifier; and
in response to receiving the data, causing the item to be fulfilled to the delivery destination.

7. The method of claim 6, wherein the printed material is at least one of a sheet of paper included in a magazine, a sheet of paper included in a book, a map, a poster, a flyer, a multi-sheet printed material, or a portion of a package.

8. The method of claim 6, further comprising:
receiving, at the computing system, the printed material delivery destination for the printed material; and
storing an association between the unique identifier and the printed material delivery destination.

9. The method of claim 6, further comprising:
at the computing system:
determining a user profile corresponding to the printed material delivery destination;
determining that the delivery destination is an item delivery destination associated with the user profile; and
storing an association between the unique identifier and at least one of the printed material delivery destination, the user profile, or the item delivery destination.

10. The method of claim 6, further comprising:
at the computing system:
determining that a supplemental criteria associated with the unique identifier is satisfied; and
determining that the supplemental criteria is at least one of an item fulfillment frequency, an expiration, or an order quantity.

11. The method of claim 6, further comprising:
at the computing system:
determining that the data includes item delivery details such that at least one of a user identifier or the delivery destination are indicated in the item delivery details; and
wherein:
the data is received from a provisioned device to which the EOD was able to connect; and
the provisioned device included the item delivery details in the data.

12. The method of claim 6, wherein:
the delivery destination is the printed material delivery destination.

13. The method of claim 6, further comprising:
at the computing system:
determining an origin location of the data based at least in part on an identifier included in the data.

14. The method of claim 13, further comprising:
at the computing system:
determining the origin location based at least in part on at least one of a Wi-Fi network identifier included in the data, a Bluetooth identifier included in the data, a near-field communication identifier included in the data, an internet protocol address included in the data, or global positioning system information.

15. The method of claim 6, further comprising:
at the computing system:
- determining a user profile;
- determining payment details for the user profile; and
- charging a fee for the item using the payment details.

16. The method of claim 6, further comprising:
including at least one of a power supply, a third memory, or a processor in the printed material.

17. A method, comprising:
including a first embedded ordering device ("EOD") in a first portion of a printed material, wherein the first EOD includes:
- a first memory storing a unique identifier;
- a communication interface;
- a circuit coupled to the communication interface that, when the first EOD is activated, is configured to at least:
  - initiate a wireless connection using the communication interface; and
  - send the unique identifier for wireless transmission;

including a second EOD in a second portion of the printed material;
including an antenna in a third portion of the printed material, wherein the antenna is configured to be selectively coupled to the first EOD or the second EOD;
at a computing system that is separate from the printed material:
- receiving data, sent from the antenna, that includes the unique identifier; and
- in response to receiving the data that includes the unique identifier:
  - determining a stored first association between the unique identifier and an item;
  - determining a stored second association between the unique identifier and a delivery destination; and
  - causing the item to be fulfilled to the delivery destination.

18. The method of claim 17, further comprising:
at the computing system:
- determining that a supplemental criteria associated with the unique identifier is satisfied; and
- determining that the supplemental criteria is at least one of an item fulfillment frequency, an expiration, or an order quantity.

19. The method of claim 17, further comprising:
at the computing system:
- determining that the data includes item delivery details such that at least one of a user identifier or the delivery destination are indicated in the item delivery details; and wherein:
- the data is received from a provisioned device to which the EOD was able to connect; and
- the provisioned device included the item delivery details in the data.

20. The method of claim 17, further comprising:
at the computing system:
- storing an association between the unique identifier and a user profile corresponding to a printed material delivery destination.

21. The method of claim 17, further comprising:
at the computing system:
- determining an origin location of the data based at least in part on an identifier included in the data.

22. The method of claim 21, further comprising:
at the computing system:
- determining the origin location based at least in part on at least one of a Wi-Fi network identifier included in the data, a Bluetooth identifier included in the data, a near-field communication identifier included in the data, an internet protocol address included in the data, or global positioning system information.

* * * * *